US012479694B2

(12) United States Patent
Kappeler

(10) Patent No.: US 12,479,694 B2
(45) Date of Patent: Nov. 25, 2025

(54) INEXPENSIVE ELEVATOR OPERATING DEVICE FOR AN ELEVATOR SYSTEM WITH DESTINATION CALL CONTROL

(71) Applicant: INVENTIO AG, Hergiswil (CH)

(72) Inventor: Markus Kappeler, Winterthur (CH)

( * ) Notice: Subject to any disclaimer, the term of this patent is extended or adjusted under 35 U.S.C. 154(b) by 1476 days.

(21) Appl. No.: 16/980,343

(22) PCT Filed: Mar. 6, 2019

(86) PCT No.: PCT/EP2019/055553
§ 371 (c)(1),
(2) Date: Sep. 11, 2020

(87) PCT Pub. No.: WO2019/174992
PCT Pub. Date: Sep. 19, 2019

(65) Prior Publication Data

US 2021/0245994 A1 Aug. 12, 2021

(30) Foreign Application Priority Data

Mar. 12, 2018 (EP) .................................... 18161227

(51) Int. Cl.
*B66B 1/46* (2006.01)
*B66B 1/34* (2006.01)
*B66B 3/00* (2006.01)

(52) U.S. Cl.
CPC ............ *B66B 1/468* (2013.01); *B66B 1/3461* (2013.01); *B66B 3/002* (2013.01);
(Continued)

(58) Field of Classification Search
CPC ....... B66B 1/468; B66B 1/3461; B66B 3/002; B66B 2201/103; B66B 2201/4615;
(Continued)

(56) References Cited

U.S. PATENT DOCUMENTS

2003/0089558 A1 5/2003 Zepke et al.
2006/0175146 A1 8/2006 Shiro
(Continued)

FOREIGN PATENT DOCUMENTS

CN 101018725 A 8/2007
CN 101137567 A 3/2008
(Continued)

*Primary Examiner* — Jorge L Carrasquillo
(74) *Attorney, Agent, or Firm* — Schlee IP International, PC; Alexander R. Schlee; Pascal A. Schlee

(57) ABSTRACT

The invention relates to an elevator system that has a number of elevator operating devices which are arranged on floors (F1, F2) of a building and which are connected to an elevator controller. At least one first elevator operating device is permanently assigned to a single destination floor (L) such that inputting an elevator call on the first elevator operating device generates a destination call comprising data that specifies the floor (F1, F2) on which the first elevator operating device is arranged as the boarding floor and the destination floor (L) which is permanently assigned to the first elevator operating device as the destination floor (L). The first elevator operating device has a housing in which a display device, an input device, and a controller are arranged, wherein the controller is communicatively coupled to the elevator controller and actuates the display device such that the display device displays the destination floor (L) which is permanently assigned to the first elevator operating device and confirms the elevator call on the first elevator operating device after the elevator call is input using the input device.

16 Claims, 3 Drawing Sheets

(52) U.S. Cl.
CPC . *B66B 2201/103* (2013.01); *B66B 2201/4615* (2013.01); *B66B 2201/463* (2013.01); *B66B 2201/4638* (2013.01); *B66B 2201/4653* (2013.01)

(58) Field of Classification Search
CPC ...... B66B 2201/463; B66B 2201/4638; B66B 2201/4653
USPC .......................................................... 187/380
See application file for complete search history.

(56) References Cited

U.S. PATENT DOCUMENTS

| | | | | |
|---|---|---|---|---|
| 2008/0236956 | A1 | 10/2008 | Finschi | |
| 2009/0294221 | A1* | 12/2009 | Bahjat | B66B 1/468 187/396 |
| 2014/0014444 | A1* | 1/2014 | Kauppinen | B66B 1/36 187/389 |

FOREIGN PATENT DOCUMENTS

| | | | |
|---|---|---|---|
| CN | 101837911 | A | 9/2010 |
| CN | 102015503 | A | 4/2011 |
| CN | 102216186 | A | 10/2011 |
| CN | 103492299 | A | 1/2014 |
| CN | 104098001 | A | 10/2014 |
| DE | 4435740 | A1 | 4/1995 |
| JP | 2007290811 | A | 11/2007 |
| JP | 2012192998 | A | 10/2012 |
| WO | WO2005121003 | A2 | 12/2005 |
| WO | WO 2010031850 | A2 * | 3/2010 |
| WO | WO2012143612 | A1 | 10/2012 |

* cited by examiner

INEXPENSIVE ELEVATOR OPERATING DEVICE FOR AN ELEVATOR SYSTEM WITH DESTINATION CALL CONTROL

CROSS-REFERENCE TO RELATED APPLICATIONS

This application is the national phase application under 35 U.S.C. § 371 claiming the benefit of priority based on International Patent Application No. PCT/EP2019/055553, filed on Mar. 6, 2019, which claims the benefit of priority based on European Patent Application No. 18161227.6 filed on Mar. 12, 2018. The contents of each of these applications are hereby incorporated by reference in their entirety.

FIELD OF THE INVENTION

The technology described here relates generally to an operating device for an elevator system and the operation thereof in a building. Exemplary embodiments of the technology relate in particular to an elevator system in which a destination call controller assigns a destination call input at an elevator operating device, and a method for operating such an elevator system.

BACKGROUND OF THE INVENTION

In buildings with elevator systems, elevator operating devices are arranged on the individual floors with which a user can call an elevator. In widespread elevator systems, an elevator operating device arranged on one floor has up/down buttons so that the user can input the desired direction of travel. In the elevator car, there is a car operating device in this elevator system so that the user can input the desired destination floor in the elevator car. In other known elevator systems, the user can already input the destination floor on an elevator operating device on the floor. For this purpose, the elevator system is equipped with a destination call controller, and the elevator operating devices arranged on the floors each have either a keyboard, a touch-sensitive screen, and/or a data acquisition device (e.g. in the form of an RFID card reader known from EP 0699617 B1 for input of the destination floor. Basically, as an alternative, (Bluetooth) radio modules are also known, e.g. from EP2238067.

Elevator systems equipped with destination call controller are usually used in buildings having a large number of floors and a correspondingly high volume of traffic. The costs for the elevator operating device are relatively low in relation to the total costs of the elevator system. However, if the concept of a destination call controller is also to be used in smaller buildings, the costs for the elevator operating devices can become increasingly important. Approaches are therefore known for equipping a destination call-based elevator system with a more cost-effective elevator operating device, for example WO 2012/143612 A1 describes an elevator operating device with a touch-sensitive screen on which a user can select the destination floor by moving a finger back and forth, and DE 4435740 describes an elevator operating device with a pushable rotary knob.

Although the approaches mentioned reduce the complexity and thus the costs of an elevator operating device, there may be further requirements for cost reduction for some buildings and thus also for the elevator system provided therein. There is therefore a need for a technology that allows these requirements to be better met.

SUMMARY OF THE INVENTION

One aspect relates to an elevator operating device for an elevator system. A display device, an input device and a controller are arranged in a housing of the elevator operating device. The controller is connected to the display device and the input device and can be communicatively coupled to an elevator controller of the elevator system. The controller actuates the display device such that it displays a single destination floor which is permanently assigned to the elevator operating device and confirms an elevator call input via the input device.

Another aspect of such a technology relates to an elevator system in which a destination floor desired by a user can be input on a floor of a building. The elevator system has an elevator control, an elevator car, which can be moved from a first floor to a second floor when actuated by the elevator controller using a drive machine, and a number of elevator operating devices arranged on floors of the building, which are connected to the elevator control. A single destination floor is permanently assigned to at least one first elevator operating device, so that an input of an elevator call on the first elevator operating device generates a destination call. The destination call includes data which indicate the floor on which the first elevator operating device is arranged as the boarding floor and the destination floor which is permanently assigned to the first elevator operating device as the destination floor. The first elevator operating device has a housing in which a display device, an input device, and a controller are arranged. The controller is communicatively coupled to the elevator controller and controls the display device in such a way that it displays the destination floor which is permanently assigned to the first elevator operating device and, after the elevator call has been input, confirms the elevator call on the first elevator operating device using the input device.

An additional aspect relates to a method for operating an elevator system in which an elevator operating device is arranged. A display device of the elevator operating device arranged on a floor is activated by a controller of the elevator operating device, the display device displaying a single destination floor which is permanently assigned to the elevator operating device. A signal is detected by the controller, the signal being generated when a user inputs an elevator call on a call input device of the elevator operating device. The dictated signal is sent by the controller to an elevator controller of the elevator system in accordance with a defined communication protocol. A destination call is registered by the elevator controller based on the signal transmitted in accordance with the communication protocol, the destination call comprising data which specify the floor on which the elevator operating device is arranged as the boarding floor and the destination floor which is permanently assigned to the elevator operating device as the destination floor. An elevator car operating the destination call is determined by the elevator controller. Allocation information is sent to the controller by the elevator controller, the allocation information indicating the elevator car operating the destination call. The display device is controlled by the controller in order to display an elevator indicator based on the allocation information.

The technology described here creates an elevator operating device to which a single destination floor is permanently assigned. At such an elevator operating device, a user can only input a destination call to this predetermined destination floor; destination calls to other floors of the building are not possible with this elevator operating device. The elevator operating device according to this technology thus differs significantly from known elevator operating devices, which allow the input of destination calls to a large number of floors in the building. The elevator operating device according to this technology therefore has a lower technical complexity and is therefore also more cost-effective.

In one exemplary embodiment, the elevator operating device has a radio transceiver which allows communication with a communication device of a user of the elevator system. The radio transceiver is configured, for example, for communication in accordance with a Bluetooth standard. The communication device can, for example, be a mobile phone, a smartphone, or a tablet PC that users already carry with them. In most cases, such a communication device has a radio module which is configured for communication in accordance with a Bluetooth standard.

Equipped with a radio transceiver, the elevator operating device according to the technology described here offers two options for inputting an elevator call, namely using the input device that a user touches or presses to select the destination floor that is permanently assigned to the elevator operating device, or using the radio transceiver that communicates with the communication device of a user. A user can use the communication device to input an elevator call that is not limited to the destination floor that is permanently assigned to the elevator operating device. This creates a simple and inexpensive elevator operating device, primarily for higher floors of a building.

These two options for inputting a call create an elevator operating device having a double function. In one of these functions, the elevator operating device serves as an interface for direct call input directly at the elevator operating device (for example, a manual call input), and in the other function the elevator operating device serves as a radio interface.

The elevator operating device according to the technology described here is very user-friendly because, for example, a visitor who wants to leave the building at the end of a visit does not have to search for the floor on which the building exit is located using a plurality of buttons, but only the single button for the floor assigned to the exit. Alternatively, users who a communication device (smartphone) with a software application (app) intended for elevator operation can use their own device to input an elevator call. To be able to give such users are, for example, people who live or work in the building. Both input options are housed in a single, small housing to save space.

In one exemplary embodiment of the elevator operating device, its display device is configured to display information, for example a floor indicator, an elevator indicator, and a direction indicator, using electronic paper. Such a display device displays the information in a legible manner and has low energy consumption.

In one exemplary embodiment of the elevator operating device, its input direction comprises a touch-sensitive input device known as a touchscreen. A touchscreen is low-maintenance, since it does not require any mechanically moving components, is easy to clean, which is particularly important for components that are touched by many people, and is relatively inexpensive. In addition, a touchscreen can be combined with a display device based on electronic paper.

A lighting device, which is activated by the controller to confirm an elevator call, also contributes to the reduced complexity of the elevator operating device. In one exemplary embodiment, the lighting device comprises one or more light-emitting diodes as light sources, which have a very low energy consumption. Such light sources enable lighting devices that offer great design freedom in terms of size and shape. In one exemplary embodiment of the elevator operating device, the lighting device enables, for example, the optical call confirmation in the form of a white or colored ring.

In one exemplary embodiment, the elevator operating device has a communication device which can be connected to a power network which supplies the elevator system with electrical energy. The communication device sends data to the elevator controller via the power network. The communication device also receives data from the elevator controller via the power network. For this purpose, the elevator controller is equipped with a corresponding communication device. The technology that enables data transmission over the power grid is known as powerline communication. An advantage of this communication is that a line network available for other purposes can be used for data transmission without the need to install an additional line network.

The technology described here can be flexibly adapted to the requirements placed on a building. For example, a second elevator operating device can be arranged on one floor, to which a single destination floor is also permanently assigned, which differs from the destination floor assigned to the first elevator operating device. As a result, the user can be given a further destination floor without having to install a complex call input device known from the prior art on the floor.

In one exemplary embodiment, the second elevator operating device is also equipped with a communication device for the powerline communication. The second elevator operating device can thus also send and receive data via the power network.

In one exemplary embodiment, the flexible adaptation to the building requirements is also supported in that an external expansion module can be connected to the elevator operating device. For this purpose, the elevator operating device has an interface device connected to the controller, which enables communication between the controller and the expansion module. The expansion module has a housing that can be arranged next to the housing of the elevator operating device. In one exemplary embodiment, the two housings have the same shape. If the housings are designed, for example, as cuboids, they can be arranged next to one another in such a way that they touch along one side or are only slightly spaced apart.

The expansion module offers at least one additional functionality that is not provided in the elevator operating device. In one exemplary embodiment, the expansion module includes a call input device that contains a keyboard or a touchscreen that displays a keypad. With the help of the keyboard, a user can input a travel request to any floor without being limited to the only destination floor that is permanently assigned to the adjacent elevator operating device.

As explained above, the technology described here creates a simple and inexpensive elevator operating device of low complexity. In comparison, the complexity of the expansion module is reduced even further, since the expansion module only contains the components that are required for the additional functionality. For example, the keyboard signals generated by the keyboard are forwarded to the interface device of the elevator operating device. The interface device forwards the keyboard signals to the central processing unit of the elevator operating device, which then communicates with the elevator controller via the (Powerline) communication device. The expansion module is also supplied with electrical energy via the interface device of the elevator operating device.

BRIEF DESCRIPTION OF THE DRAWINGS

Various aspects of the improved technology are described in greater detail below with reference to exemplary embodiments in conjunction with the drawings. In the figures, identical elements have identical reference numerals, in which.

DETAILED DESCRIPTION OF EMBODIMENTS OF THE INVENTION

Figure 1:
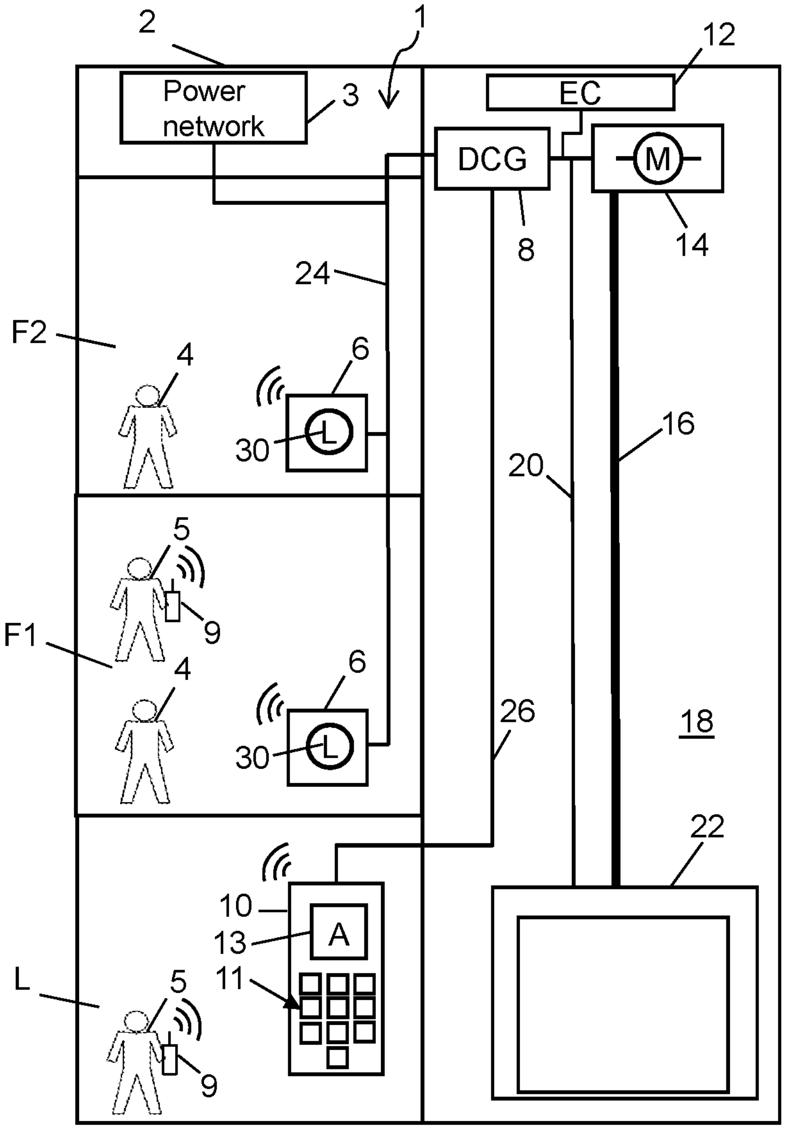
FIG. 1 is a schematic illustration of an exemplary situation in a building having a plurality of floors and having an elevator system.

FIG. 1 is a schematic illustration of an exemplary situation in a building 2 which has a plurality of floors F1, F2, L, which are served by an elevator system 1. For reasons of illustration, from the elevator system 1, only one elevator controller 8, 12, which is equipped with a destination call controller, a drive machine 14, a suspension element 16 (e.g. steel cables or flat belts), and an elevator car 22 hanging on the suspension element 16 and movable in a shaft 18 are shown in FIG. 1 (hereinafter also referred to as car 22). The person skilled in the art recognizes that the elevator system 1 can also comprise a plurality of cars 22 in one or more shafts 18, which are controlled by a group control. Instead of a traction elevator shown in FIG. 1, the elevator system 1 can also have one or more hydraulic elevators. The person skilled in the art also recognizes that the elevator system 1 has an installation-specific power network 3, through which the elevator system 1 is supplied with electrical energy. The power network 3 is connected to a house connection of the building 2. A house connection is the connection point between an energy distribution network of a power supply company and the internal electrical lines.

In the exemplary embodiment shown in FIG. 1, the elevator controller 8, 12 consists of two subsystems, a call allocation system 8, and a control system 12. The call allocation system 8 comprises a computer which allocates a destination call (i.e. the elevator call indicates the boarding floor and the destination floor) to an elevator car 22 according to an allocation algorithm. Such allocation algorithms are known to the person skilled in the art. The call allocation system 8 also includes a device for sending and receiving signals via the power network 3. Since the call allocation system 8 establishes a connection between components connected to the power network 3 and the computer, the call allocation system can also be referred to as a destination call gateway (DCG). The control system 12 controls the drive machine 14, among other things, such that the allocated car 22 is moved from the boarding floor to the destination floor.

In the exemplary embodiment shown, at least one device (6, 10) is arranged on each floor F1, F2, L, by means of which users 4, 5 can input elevator calls, for example. In the following, the devices 6 on the floors F1, F2 are referred to as "elevator operating devices 6" and the device 10 on the floor L is referred to as "floor call device 10." In the situation shown in FIG. 1, each of the elevator operating devices 6 displays a floor indicator 30 which indicates the destination floor which is permanently assigned to it; in FIG. 1 and FIG. 2A, for example, the character "L" is displayed as the floor indicator 30 for the floor L. In another exemplary embodiment, different floors can be permanently assigned to the elevator operating device 6 on the floor F2 and the elevator operating device 6 on the floor F1; in this case, the floor indicators 30 differ.

The floor L can be an entrance hall of the building 2, into which the users 4, 5 enter when entering building 2 and from which the users 4, 5 leave building 2 again. If a user 4, 5 enters the floor L, each floor F1, F2 of the building 2 can be reached with the elevator system 1 from there, with appropriate access authorization. The floor call device 10 on the floor L is shown in FIG. 1 by way of example with a keyboard 11 and a display device 13 in order to indicate that a user 4, 5 on the floor L can input an elevator call (destination call) to any destination floor using the keyboard 11 and that the user 4, 5 can be informed of the car 22 operating the elevator call using the display device 13. As an alternative to the keyboard 11, a touchscreen, an RFID reader, a reader for an optical code (e.g. bar code, QR code, or color code) or a radio module which can be connected to a portable communication device 9 (e.g. mobile radio/cell phone, smartphone, Tablet PC) of a user 5, can be used to enable the call input. The person skilled in the art recognizes that the user 4, 5 is informed of the car 22 operating the elevator call even with these alternatives.

FIG. 1 shows two categories of users 4, 5. The users 5 can be, for example, people who live or work in the building 2; these users 5 each carry a communication device 9, which is configured, among other things, to operate the elevator system 1, as is described in more detail elsewhere in this description. Users 5 are shown on floors F1 and L by way of example. The users 4 can be, for example, visitors who do not regularly stay in the building 2 and do not necessarily carry with them a communication device 9 which is configured to operate the elevator system. In FIG. 1, the users 4 are shown without a communication device 9. Users 4 are shown on the floors F1, F2 by way of example.

In the situation shown in FIG. 1, the technology described here can be used in an advantageous manner. Briefly and by way of example, each elevator operating device 6 is permanently assigned to a single destination floor L. A user 4 (visitor without communication device 9) can only input a travel request (elevator call) to the single destination floor L which is permanently assigned to the elevator operating device 6 at each of these elevator operating devices 6. By inputting the elevator call, a destination call is registered that includes data that specify the floor F1, F2 on which the elevator operating device 6 is arranged as the boarding floor and the destination floor L which is permanently assigned to the elevator operating device 6 as the destination floor L. It is not possible to input a different destination floor L on this elevator operating device 6.

Figure 2A:
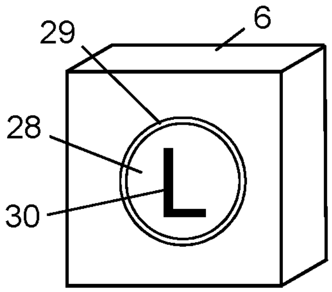
FIG. 2A is a schematic illustration of an exemplary embodiment of an elevator operating device, which indicates a destination floor that is permanently assigned to the elevator operating device.
Figure 2B:
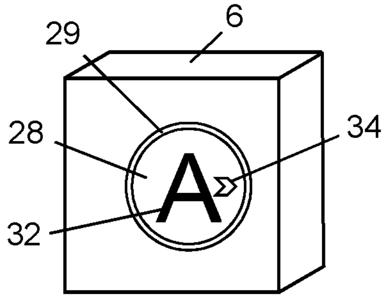
FIG. 2B is a schematic illustration of the elevator operating device from FIG. 2A, which displays an elevator indicator and a direction indicator after an elevator call has been input.

In FIG. 1, the same destination floor L is permanently assigned to each elevator operating device 6. As indicated in FIGS. 1 and 2A, the elevator operating devices 6 display the floor indicator 30 on a user interface 28 of a display device 50 shown in FIG. 3. For example, if a user 4 on the floor F2 inputs an elevator call at the elevator operating device 6 arranged there (e.g. by pressing or touching the floor indicator 30 ("L")), the elevator controller 8, 12 registers a travel request from the floor F2 (boarding floor) to floor L (destination floor). Thereupon, the elevator controller 8, 12 determines a car 22 operating this travel request and informs the user 4. For example, the elevator controller 8, 12 controls the elevator operating device 6 in such a way that its user interface 28 displays an elevator indicator 32 (e.g. "A") indicating the car 22 operating the travel request, as shown in FIG. 2B. In one exemplary embodiment, the display device 28 displays a direction indicator 34 shown in FIG. 2B, for example in addition to the elevator indicator 32, in order to show the user 4 the direction to the assigned car 22.

As mentioned above, a single destination floor L is permanently assigned to each elevator operating device 6. Such a fixed assignment can take place, for example, in connection with the installation of the elevator system 1 in the building 2. In the elevator operating devices 6, for example, configuration data can be stored which include the individual identifier for each elevator operating device 6. A storage device of the elevator controller 8, 12 stores the location (floor) and the permanently assigned destination floor L in a data record for each identifier. The data records for the elevator operating devices 6 present in the elevator system 1 are stored, for example, during the installation of the elevator system 1. If a user 4 inputs an elevator call at an elevator operating device 6, the elevator operating device transmits its identifier to the elevator controller 8, 12. For the call allocation, the elevator controller 8, 12 uses the identifier in order to determine the location of the elevator operating device 6 in question and the destination floor L which is permanently assigned to it from the storage device. In another exemplary embodiment, the configuration data can be stored in the elevator operating devices 6 and can be transmitted to the elevator controller 8, 12 when an elevator call is input. For this purpose, the elevator operating devices 6 can have an interface device via which the configuration data are fed to the elevator operating devices 6.

In one exemplary embodiment, the configuration data can be changed, for example if the requirements and/or the use of the building 2 changes. In such a case, another (new) destination floor L can be permanently assigned to an elevator operating device 6. The person skilled in the art recognizes that, depending on the configuration, the configuration data can be changed in the storage device of the elevator controller 8, 12 or in the individual elevator operating devices 6.

The elevator operating devices 6 are coupled to the elevator controller 8, 12 via a line network 24, and the floor call device 10 is connected to the elevator controller 8, 12 via a line 26. The line 26 is configured, for example, for an Ethernet connection to the elevator controller 8, 12. In one exemplary embodiment, the line 26 between the floor call device 10 and the elevator controller 8, 12 consists of a line-bound data network which is based, for example, on Ethernet technology. The communication between the elevator controller 8, 12 and the floor call device 10 takes place in accordance with a protocol for line-bound communication, for example the Ethernet protocol.

The line network 24 is part of the power network 3, which supplies the elevator system 1 with electrical energy. The power network 3 in a building 2 generally comprises a conductor, a neutral conductor, and a protective conductor. In one exemplary embodiment, two lines lead from each elevator operating device 6, one line being connected to the conductor of the power network 3 and one line being connected to the neutral conductor. If the elevator operating devices 6 and the elevator controller 8, 12 are equipped accordingly (as described in more detail in connection with FIG. 3), in one exemplary embodiment there is a data transmission between the elevator operating devices 6 and the elevator controller 8, 12 using carrier frequency technology, which is also known as Powerline Communication (PLC). The person skilled in the art recognizes that the two lines of the elevator operating device 6 supply electrical energy for their operation.

Figure 3:
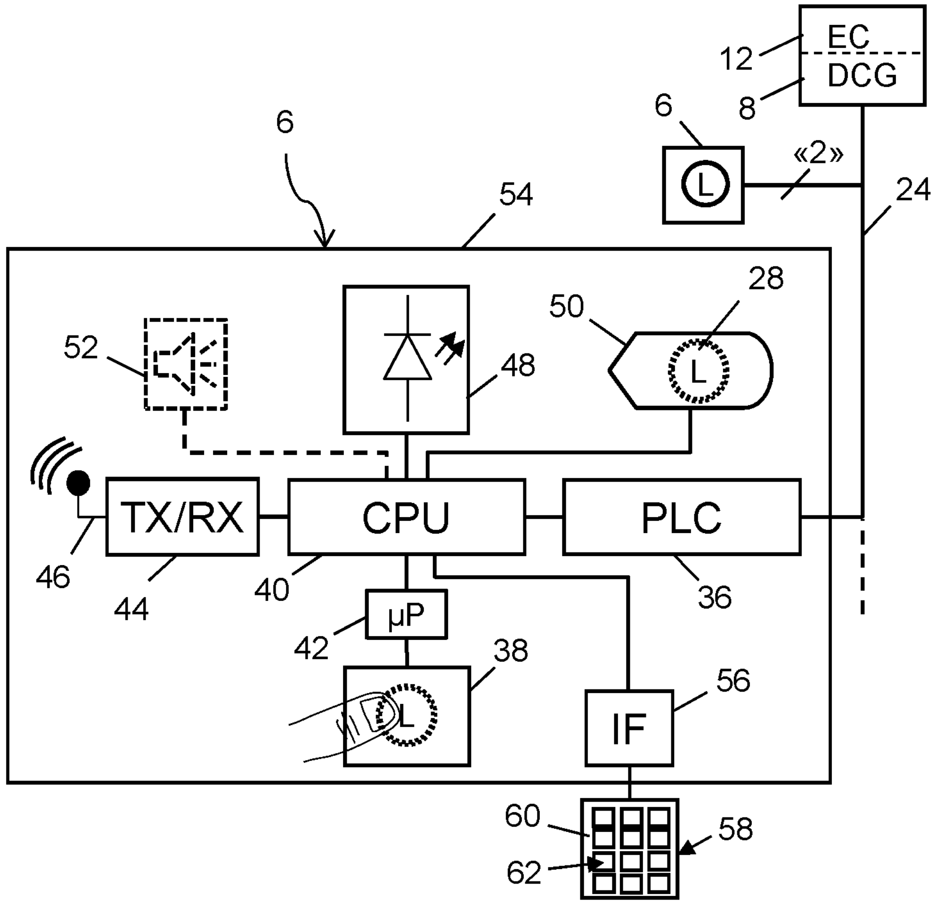
FIG. 3 is a schematic block diagram of an exemplary embodiment of an elevator operating device.

FIG. 3 shows a schematic block diagram of an exemplary embodiment of an elevator operating device 6, which is connected to the elevator controller 8, 12 via the line network 24. FIG. 3 indicates that further elevator operating devices 6 are connected to the line network 24. In a housing 54 of the elevator operating device 6, lighting device 48, a display device 50, a communication device 36 (PLC), an input device 38, an interface device 56 (IF), and a transmitting and receiving device for radio signals 44 (TX/RX) with an antenna 46 are arranged, which are connected to a controller 40, 42 which is also arranged in the housing 54. Depending on the design of the elevator operating device 6, it can comprise an electroacoustic transducer 52 (for example a loudspeaker or buzzer) which is connected to the controller 40, 42; the electroacoustic transducer 52 is shown as a dashed line as an optional component. The electroacoustic transducer 52 can be used, for example, to output a voice message or an audible signal tone, for example to acoustically confirm an elevator call to the user 4.

In the exemplary embodiment shown, the controller 40, 42 comprises a central processing unit (CPU) and a processor 42, which are shown as separate components. The processor 42 is connected to the central processing unit 40 and the input device 38. The processor 42 detects, for example, a signal that is generated by the input device 38 when the user 4 inputs an elevator call to it. The person skilled in the art recognizes that the central processing unit 40 and the processor 42, or their functions, can be combined in a controller (40, 42); accordingly, the function of the processor 42 can be performed by the central processing unit 40, and the illustration of the processor 42 can be omitted in FIG. 3.

Controlled by the central processing unit 40, the display device 50 displays the floor indicator 30 or the elevator indicator 32 (possibly in connection with the direction indicator 34), depending on the situation. In FIG. 3, the display devices 50 shows the floor indicator 30 ("L") for illustration. In one exemplary embodiment, the display device 50 includes a device that displays the indicators 30, 32, 34 and any other characters using a display technology known as electronic paper (also known as e-paper). This display technology, which is for example based on electrophoresis, simulates the appearance of ink or color on paper. The device provided for this purpose of the display device 50 has an e-paper display which reflects light like normal paper; it is a passive (non-luminous) display. For example, characters, texts, or images are displayed permanently without the need for maintenance voltage. Electrical energy is only required if the display is changed.

In one exemplary embodiment, the input device 38 comprises a touchscreen. The functionality and structure of a touchscreen are generally known to the person skilled in the art. In one exemplary embodiment, the input device 38 and the display device 50 form a unit which is arranged in the housing 54 in such a way that it is accessible to a user 4. Such a unit is, for example, similar to a display unit that is used in a so-called e-book reader to display text and to react to touches by the reader (e.g. scrolling or marking text). In relation to the elevator operating device 6, the user 4 can read the displayed indicator 30, 32, 34, for example, and touch the displayed destination floor indicator 30 upon a travel request (for illustration, a finger is shown in FIG. 3 above the input device 38).

The lighting device 48 serves to illuminate the user interface 28 of the elevator operating device 6, or only areas of the user interface 28. Controlled by the central processing unit 40, the lighting device 48 can illuminate the display devices 50, or their user interface 28, with white light so that the displayed indicators (30, 32, 34) can be perceived by a user 4, in particular in poor lighting conditions. The lighting device 48 can also illuminate the user interface 28 with colored light in order to confirm the input of the elevator call to the user 4. Such confirmation can take place, for example, in that a ring 29 shown in FIG. 2A and FIG. 2B and shown on the user interface 28 lights up in color. In one exemplary embodiment, the lighting device 48 comprises one or more LED light sources.

The communication device 36 comprises a carrier frequency system (TFA) which enables data transmission via an existing power network 3. Carrier frequency systems use the known carrier frequency technology in order to make multiple use of existing transmission paths. The signals are additionally modulated onto the lines of the power network 3 via one or more carrier frequencies, for example using the conductor and the neutral conductor of the power network 3 (this is indicated in FIG. 3 by the identification "2"). Due to the multiple use of existing lines, these transmission methods are very quick and inexpensive to implement and realize. The person skilled in the art recognizes that the elevator controller 8, 12 likewise has a carrier frequency system in order to receive data from the elevator operating device 6 and to send it to the latter.

The transmitting and receiving device 44 is connected to the antenna 46 and is configured to receive radio signals; it is also referred to below as a radio transceiver 44. The radio transceiver 44 communicates with a portable communication device 9 of a user 5 when it is within radio range of the radio transceiver 44, i.e. a radio signal emitted by the communication device 9 has a signal strength at the location of the radio transceiver 44 (for example expressed by an RSSI value (Received Signal Strength Indicator)), which is greater than a threshold value defined for secure reception. Communication takes place, for example, via a near-field radio network such as a Bluetooth radio network, or a WLAN/WiFi radio network. Bluetooth is a standard according to IEEE 802.15.1, and WLAN/WiFi is a standard according to IEEE 802.11; radio networks in accordance with these standards serve for the wireless networking of devices over a short distance of approx. a few meters. The radio network forms the interface via which the communication device 9 and the radio transceiver 44 communicate with one another.

In one exemplary embodiment, the radio transceiver 44 in the elevator operating device 6 can have the function of a fixed radio beacon. Such a radio beacon is also known as a "beacon" or "Bluetooth beacon." The data is transferred using Bluetooth Low Energy (BLE) technology.

In one exemplary embodiment, the radio transceiver 44 and the communication device 9 are configured to communicate with one another in accordance with the Bluetooth standard. If the communication device 9 is, for example, a smartphone, application-specific software (also known as an "app") can be installed thereon, which enables the elevator system 1 to be operated using a user interface. An example of an app suitable for this application is the myPORT app from the Schindler Group. A user 5 can use the user interface, for example, to select a desired destination floor. The smartphone communicates the selected destination floor to the radio transceiver 44 of the elevator operating device 6, which forwards the corresponding information to the elevator controller 8, 12. If the elevator controller 8, 12 has selected a car 22 for operating this travel request, an indicator corresponding to this car 22 is displayed on the smartphone of the user 5.

FIG. 3 also shows an expansion module 58, which is connected to the interface device 56 of the elevator operating device 6. The expansion module 58 offers the possibility of expanding the function of the elevator operating device 6 (input of a destination call to a single destination floor permanently assigned to the elevator operating device 6) with at least one further functionality. In the exemplary embodiment shown, the expansion module 58 has a housing 60 in which a call input device 62 is arranged. The call input device 62 may include a keyboard; alternatively, the call input device 62 may include a touch screen that displays a keypad. The person skilled in the art recognizes that the expansion module 58 can have a lighting device in order to, for example, illuminate the keyboard or to optically confirm a key press. The expansion module 58 can also be used to support users 4 with a physical impairment (for example those with limited vision) in the operation of the elevator system 1. The call input device 62 can, for example, represent destination floors F1, F2 by Braille.

The expansion module 58 enables flexible adaptation to requirements that may arise in the building 2. The interface device 56 enables communication between the controller 40, 42 and the expansion module 58. The expansion module 58 only contains the components that are required for the additional functionality; a radio transceiver or a (powerline) communication device are not available. This means, for example, that the expansion module 58 only has to be connected to the elevator operating device 6; separate communication with the elevator controller 8, 12 is not necessary. If an elevator call is input on the expansion module 58 using the keyboard, the keyboard signals generated by the keyboard are forwarded to the interface device 56 of the elevator operating device 6. The interface device 56 forwards the keyboard signals to the central processing unit 40 of the elevator operating device 6, which then communicates with the elevator controller 8, 12 via the (powerline) communication device 36.

The expansion module 58 is electrically connected in series to the elevator operating device 6 and is supplied with electrical energy via the interface device 56 of the elevator operating device 6. An arrangement or connection concept in which a number of components are connected to one another in series is also known as a "daisy chain." The first component (i.e. the elevator operating device 6) is directly connected to a computer system (i.e. the elevator controller 8, 12). The other components (i.e. the expansion module 58) are now each connected to their predecessors (series connection principle). Signals to and from a component now go through its predecessors to the computing system.

The person skilled in the art recognizes that more than one elevator operating device 6 can be arranged on one floor F1, F2. In such a case, a different destination floor F1, F2 can be permanently assigned to each of these elevator operating devices 6. On such a floor F1, F2, for example a floor L (entrance hall) can be permanently assigned to a first elevator operating device 6 and a floor on which, for example, a restaurant or a viewing platform is located can be assigned to a second elevator operating device. In another exemplary embodiment, the same destination floor F1, F2 can be permanently assigned to each of these elevator operating devices 6, for example in order to avoid a crowd in front of an elevator operating device 6 after the end of an event. Depending on the building situation, an elevator operating device 6 can be arranged in the vicinity of a shaft door (for example on a building wall), but it can also be arranged at other locations on the floors F1, F2.

For an arrangement of an elevator operating device 6 on a shaft door or a building wall, its housing 54 can be mounted on the wall or the shaft door. Alternatively, the housing 54 can be inserted entirely or partially into a recess in the wall or the shaft door, the user interface 28 remaining accessible to a user 4. Depending on the arrangement provided, the housing 54 can be almost closed, so that only openings for the passage of the line 24 and for access to the interface device 56 are provided. For installation in the wall or the shaft door, the housing 54 can be open, for example, at least on one side, e.g. a back.

The housing 54 can be designed in various ways, for example to meet special requirements for the design of the elevator operating device 6. In one exemplary embodiment, the housing 54 (in a plan view) has the shape of a cuboid with a square base area. In one exemplary embodiment, the housing 60 of the expansion module 58 likewise has the shape of a cuboid with a square base area and the same dimensions as the housing 54. The housing 54 of the elevator operating device 6 can be arranged next to the housing 60 of the expansion module 58; housings 54, 60 can also be arranged such that they touch. The person skilled in the art recognizes that the housings 54, 60 can have shapes that differ from a cuboid. In one exemplary embodiment, the two housings 54, 60 have the same shape. If the housings 54, 60 are designed, for example, as cuboids, they can be arranged next to one another in such a way that they touch along one side or are only slightly spaced apart. In one exemplary embodiment, such a cuboid has a square base area with a side length that is longer than the height of the cuboid.

The person skilled in the art recognizes that instead of the floor call device 10 shown in FIG. 1, an elevator operating device 6 in combination with an expansion module 58 can be arranged on the floor L. In one exemplary embodiment, the elevator operating device 6 is also permanently assigned to a destination floor. The permanently assigned destination floor can, for example, be a publicly accessible floor on which, for example, a restaurant or a panoramic terrace is located. Since the elevator operating device 6 displays the permanently assigned destination floor, a visitor who may not be familiar with the building 2 does not need to search for the destination floor between a plurality of destinations or buttons. In this exemplary embodiment, the expansion module 58 comprises the keyboard shown in FIG. 3, such that the users 4 can select a desired floor F1, F2. In this case, the line 26 can be omitted since the elevator operating device 6 is connected to the power network 3 via the line 24.

Figure 4:
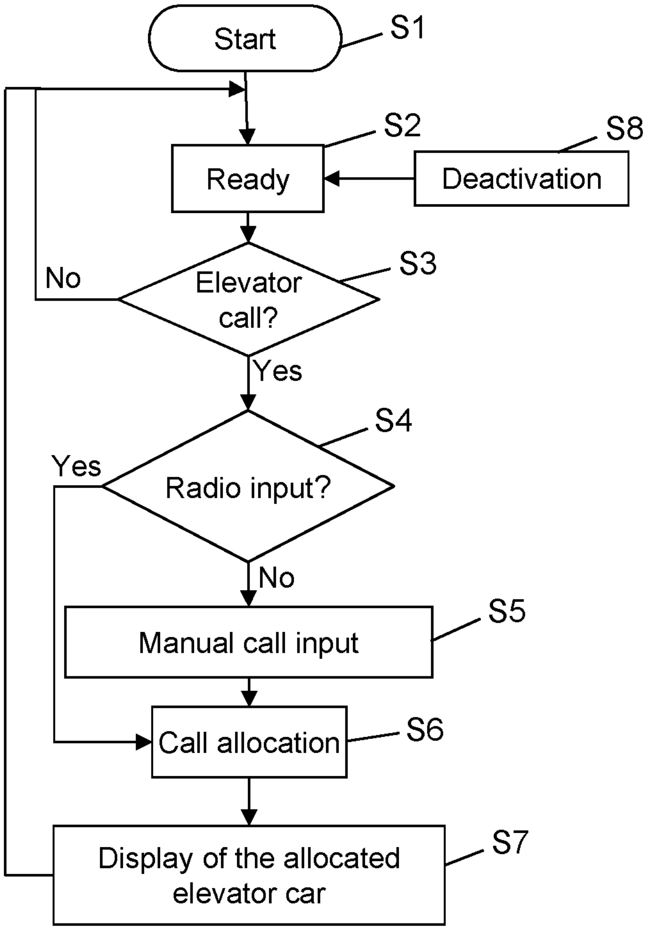
FIG. 4 is an exemplary illustration of an exemplary embodiment of a method for operating an elevator system having an elevator operating device which displays a destination floor that is permanently assigned to the elevator operating device.

With the understanding of the above-described basic system components of the elevator system 1 and their functionalities, a description of an exemplary method for operating the elevator system 1 shown in FIG. 1 is given below with reference to FIG. 4. The description is made with reference to a user 4 (visitor without communication device 9) who, after the end of his visit, leaves the building 2 and therefore wants to take the elevator from one floor F1, F2 into the entrance hall of building 2 (floor L).

Each elevator operating device 6 is activated so that a display device 50 of an elevator operating device 6 arranged on a floor F1, F2 shows a single destination floor L which is permanently assigned to the elevator operating device 6. The radio transceiver 44 of the elevator operating device 6 is also activated. The elevator operating devices 6 are therefore ready to receive an elevator call from a user 4, 5. This readiness is indicated in step S2. The elevator operating devices 6 remain in this state of readiness until they are deactivated (for example during maintenance work), which is indicated by a deactivation event S8.

In a step S3, the method waits for an elevator call to be input. If there is no elevator call, the method remains on standby, which is indicated by the loop along the "no" branch back to step S2. If, on the other hand, an elevator call is made, the method proceeds to step S4 along the "yes" branch.

In step S4, it is checked whether the elevator call was made using a radio input. A radio input occurs when the radio transceiver 44 receives an elevator call from a communication device 9 of a user 5. If this is the case, the method proceeds to a step S6 along the "yes" branch. If, on the other hand, there is no radio input, the method proceeds to step S5 along the "no" branch.

In step S5, it is recognized that a user 4 has input a manual call on an elevator operating device 6. For this purpose, the controller 40, 42 detects a signal that is generated when the user 4 inputs an elevator call on a call input device 38 of the elevator operating device 6. The controller 40, 42 sends the detected signal to the elevator controller 8, 12 in accordance with a defined communication protocol. The communication protocol also transmits, for example, an identifier of the elevator operating device 6, so that the elevator controller 8, 12 can recognize the elevator operating device 6 (or on which floor F1, F2) the elevator call was input.

In step S6, the elevator call is allocated to an elevator car 22. For this purpose, a destination call is registered by the elevator controller 8, 12 based on the signal transmitted in accordance with the communication protocol. The destination call includes data which indicate the floor F1, F2 on which the elevator operating device 6 is arranged as the boarding floor and the destination floor L permanently assigned to the elevator operating device 6 as the destination floor L. An allocation algorithm is used for the call allocation; allocation algorithms of this type are known to the person skilled in the art.

In step S7, the elevator car 22 assigned to the elevator call is displayed by the display device 50. For this purpose, the elevator controller 8, 12 sends the allocation information relating to the elevator car 22 to the controller 40, 42. The controller 40, 42 controls the display device 50 accordingly in order to display an elevator indicator 32 based on the allocation information. The elevator indicator 32 is displayed for a predetermined period of time, for example for a few seconds (e.g. 1-2 seconds).

In one exemplary embodiment, the elevator indicator 32 is displayed from the perspective of the user 4 almost simultaneously with the confirmation that the elevator call has been registered. This is possible because the call allocation takes place very quickly using known allocation algorithms, for example within milliseconds. In one exemplary embodiment, the confirmation of an elevator call is made by the lighting device 48. Alternatively or additionally, the confirmation can also take place acoustically, for example using the electroacoustic transducer 52.

After the display of the elevator indicator 32 has gone out again, the elevator operating device 6 is again ready to receive a new elevator call. This is indicated by the loop back to step S2.

The invention claimed is:

1. Elevator operating device for an elevator system comprising:

a housing;

a display device arranged in the housing;

an input device arranged in the housing, and a controller arranged in the housing, which is connected to the display device and the input device and which is communicatively coupled to an elevator controller of the elevator system, wherein the input device is configured to generate a destination call from a boarding floor to a single destination floor (L) permanently assigned to the elevator operating device; and wherein the controller is configured to actuate the display device in such a way that it displays the single destination floor (L) permanently assigned to the elevator operating device and is configured to confirm an elevator call input via the input device.

2. Elevator operating device according to claim 1, wherein the display device is configured to display information using electronic paper.

3. Elevator operating device according to claim 1, wherein the input device comprises a touchscreen.

4. Elevator operating device according to claim 1, further comprising a communication device connected to the controller, which can be connected to a power network that supplies the elevator system with electrical energy, wherein the communication device is configured to send and receive data from the elevator controller via the power network.

5. Elevator operating device according to claim 1, further comprising a lighting device connected to the controller, which activates the controller to confirm the elevator call.

6. Elevator operating device according to claim 1, further comprising a radio transceiver for communication with a communication device of a user of the elevator system, wherein the radio transceiver is connected to the controller.

7. Elevator operating device according to claim 1, further comprising an interface device connected to the controller, via which an external expansion module can be connected to the elevator operating device.

8. Elevator system, in which a destination floor (L) desired by a user can be input on a floor (F1, F2) of a building, the elevator system comprising an elevator controller, an elevator car, which can be moved from a first floor (L, F1, F2) to a second floor (L, F1, F2) when actuated by the elevator controller using a drive machine, and a number of elevator operating devices which are arranged on floors (F1, F2) of the building and which are connected to the elevator controller; wherein at least one first elevator operating device is configured to be permanently assigned to a single destination floor (L), so that an input of an elevator call on the first elevator operating device generates a destination call comprising data that specifies the floor (F1, F2) on which the first elevator operating device is arranged as the boarding floor and the destination floor (L) which is permanently assigned to the first elevator operating device as the destination floor (L), wherein the first elevator operating device comprises a housing in which a display device, an input device, and a controller are arranged, wherein the controller is communicatively coupled to the elevator controller and configured to actuate the display device such that the display device displays the destination floor (L) which is permanently assigned to the first elevator operating device and configured to confirms the elevator call on the first elevator operating device after the elevator call is input using the input device.

9. Elevator system according to claim 8, wherein the first elevator operating device also has a communication device which is connected to the controller and is connected to a power network of the building that supplies the elevator system with electrical energy, wherein the communication device is configured to send and receive data from the elevator controller via the power network.

10. Elevator system according to claim 9, wherein a second elevator operating device is arranged on a floor (F1, F2) and is permanently assigned to a single destination floor (L) which differs from the destination floor (L) assigned to the first elevator operating device.

11. Elevator system according to claim 10, wherein a communication device of the second elevator operating device is connected to the power network and is configured to send data to and receive data from the elevator controller via the power network.

12. Elevator system according to claim 8, wherein the first elevator operating device has an interface device which is connected to the controller and an expansion module, the expansion module being a housing which is arranged next to the housing of the first elevator operating device.

13. Elevator system according to claim 12, wherein the expansion module has a call input device having a keyboard or a touch-sensitive surface, on which a plurality of keys for inputting an elevator call can be displayed.

14. Elevator system according to claim 8, wherein the first elevator operating device also has a radio transceiver for communication with a communication device of the user, the radio transceiver also being connected to the controller.

15. Method for operating an elevator system having an elevator operating device, wherein a call input device is configured to generate a destination call from a boarding floor to a single destination floor (L) permanently assigned to the elevator operating device, and wherein a display device of the elevator operating device arranged on one floor (F1, F2) is activated by a controller of the elevator operating device, wherein the display device, upon actuation, displays the single destination floor (L), said method comprising:

detecting a signal via the controller which is generated when an elevator call is input on the call input device of the elevator operating device by a user;

sending the detected signal by the controller according to a defined communication protocol to an elevator controller of the elevator system;

registering the destination call by the elevator controller based on the signal transmitted in accordance with the communication protocol, the destination call comprising data that specify the floor (F1, F2) on which the elevator operating device is arranged as the boarding floor and the destination floor (L) which is permanently assigned to the elevator operating device as the destination floor (L);

determining an elevator car operating the destination call by the elevator controller;

sending allocation information to the controller via the elevator controller, the allocation information indicating the elevator car operating the destination call; and actuating the display device using the controller in order to display an elevator indicator based on the allocation information.

16. Method according to claim 15, further comprising detecting a signal by the controller that is generated when a radio transceiver receives an elevator call from a communication device of the user.

* * * * *